(12) United States Patent
Brelski et al.

(10) Patent No.: US 8,348,661 B2
(45) Date of Patent: Jan. 8, 2013

(54) CHECK VALVE FOR AN INJECTION MOLDING MACHINE

(75) Inventors: Maciej Brelski, Brampton (CA); Christophe Halter, Selange (BE)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 48 days.

(21) Appl. No.: 13/126,193

(22) PCT Filed: Nov. 23, 2009

(86) PCT No.: PCT/CA2009/001662
§ 371 (c)(1),
(2), (4) Date: Apr. 27, 2011

(87) PCT Pub. No.: WO2010/066002
PCT Pub. Date: Jun. 17, 2010

(65) Prior Publication Data
US 2011/0229597 A1    Sep. 22, 2011

Related U.S. Application Data

(60) Provisional application No. 61/121,240, filed on Dec. 10, 2008, provisional application No. 61/246,185, filed on Sep. 28, 2009.

(51) Int. Cl.
*B29C 45/60* (2006.01)
(52) U.S. Cl. .......................................... 425/563; 366/77
(58) Field of Classification Search .................. 425/563, 425/564, DIG. 224; 366/77
See application file for complete search history.

(56) References Cited

U.S. PATENT DOCUMENTS

| | | | | |
|---|---|---|---|---|
| 4,643,665 | A | * 2/1987 | Zeiger | 425/563 |
| 4,966,539 | A | * 10/1990 | Pena | 425/208 |
| 4,988,281 | A | 1/1991 | Heathe et al. | |
| 5,112,213 | A | 5/1992 | Oas | |
| 5,167,971 | A | 12/1992 | Gill et al. | |
| 5,240,398 | A | 8/1993 | Akaguma et al. | |
| 5,441,400 | A | * 8/1995 | Zeiger | 425/562 |
| 6,155,816 | A | * 12/2000 | Urbanek et al. | 425/559 |
| 6,554,603 | B1 | * 4/2003 | Schreiner et al. | 425/559 |
| 6,585,001 | B2 | * 7/2003 | Gatti | 137/533.27 |

FOREIGN PATENT DOCUMENTS

EP    1342547 A1    9/2003

OTHER PUBLICATIONS

PCT International Search Report, Dec. 16, 2009, Pengfei Zhang, 3 pages.

* cited by examiner

*Primary Examiner* — Tim Heitbrink
(74) *Attorney, Agent, or Firm* — Husky Intellectual Property Services

(57) ABSTRACT

A check valve (36, 136) for a screw (24) is provided. The check valve (36, 136) includes a retainer tip (54, 154), operable to be attached to a distal end of a screw shaft (52, 152), the retainer tip (54, 154) defining at least one melt channel (30). A first ring (60) is coaxially mounted to and rotationally-coupled with the retainer tip (54, 154). A second ring (66) is coaxially and slidably mounted to the retainer tip (54, 154), and is operable to rotate relative to the retainer tip (54, 154). The second ring (66) is operable to reversibly move between an open position which permits melt to flow through the check valve (36, 136) and a closed position which prevents backflow of the melt.

13 Claims, 5 Drawing Sheets

CHECK VALVE FOR AN INJECTION MOLDING MACHINE

FIELD

The following relates to injection molding machinery. More specifically, what follows relates to check valves used in the barrels of an injection unit.

BACKGROUND

Some examples of known molding systems are: (i) the HyPET ™ Molding System, (ii) the Quadloc ™ Molding System, (iii) the Hylectric ™ Molding System, and (iv) the HyMet ™ Molding System, all manufactured by Husky Injection Molding Systems, Ltd.

The injection molding process typically comprises preparing a polymeric (or sometimes metal) material in an injection unit of an injection unit for melting, injecting the now-melted material under pressure into a closed and clamped mold, solidifying the material in its molded shape, opening the mold and ejecting the part before beginning the next cycle. The molding material typically is supplied to the injection unit from a hopper in the form of pellets or powder. The injection unit transforms the solid material into a molten material (sometimes called a "melt"), typically using a feed screw, which is then injected into a hot runner or other molding system under pressure from the feed screw or a plunger unit. A shut off valve assembly is often provided to stop and start the flow of molten material from the barrel to the molding system.

Many screws mount check valves at their distal end to prevent melt from flowing back during injection. A typical prior-art check valve is shown in FIG. 1 at 5. Check valve 5 is mounted at the distal end of a screw 7, and has a ring 9 floatably mounted around the shaft 11 between a tip retainer 13 and a rear seat 15. Ring 9 abuts against the interior surface of the injection barrel 17. During the recovery phase, melt pressure forces the screw 7 rearward, allowing the melt to flow under the ring 9 (which remains substantially in place) and through channels formed in the tip retainer 13 towards the end of the barrel 17. During the injection phase, the screw 7 moves forward, bringing the rear seat 15 into contact with the ring 9, and thereby closing off the melt path throughout the remainder of the injection stroke.

As is known to those of skill in the art, check valves have simple flow paths (in comparison to other types of check valves), resulting in lower shear rates and fewer hang-up spots for the melt. However, wear of the tip retainer and the ring is a common problem in prior art check valves. During recovery, the tip retainer rotates with the screw and the ring freely floats in the barrel. Relative movement of the contact surfaces of both the tip retainer and the ring, loaded with recovery pressure and viscous drag forces, causes the wear failure of these components. The problem is especially severe for high performance machines, which recover using high screw RPMs.

Some prior art check valves have used carbide inserts on the tip retainer (not shown) to increase the service life of the wearing components. Unfortunately, because of the small bearing area between the wear surfaces on the tip retainer and ring, the problem has not been eliminated and failures of such check valves due to wear still occur.

SUMMARY OF THE INVENTION

According to a first aspect of the invention, there is provided a check valve for a screw. The check valve includes a retainer tip, operable to be attached to a distal end of a screw shaft, the retainer tip defining at least one melt channel. A first ring is coaxially mounted to and rotationally-coupled with the retainer tip. A second ring is coaxially and slidably mounted to the retainer tip, and is operable to rotate relative to the retainer tip. The second ring is operable to reversibly move between an open position which permits melt to flow through the check valve and a closed position which prevents backflow of the melt.

BRIEF DESCRIPTION OF THE DRAWINGS

Exemplary embodiments of the present invention will now be described with reference to the accompanying drawings, in which.

DETAILED DESCRIPTION OF THE NON-LIMITING EMBODIMENTS

Figure 2:
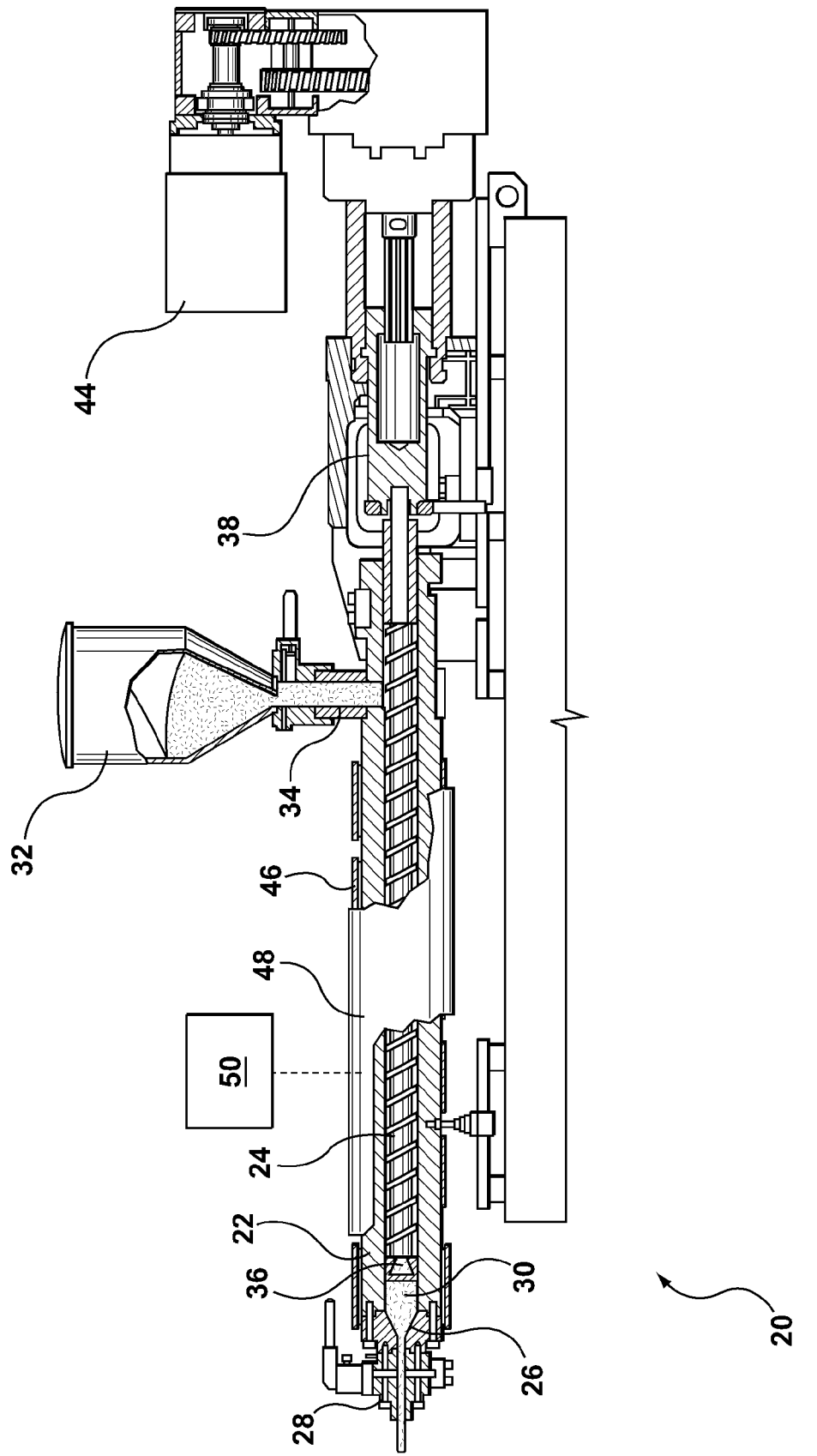
FIG. 2 is a cross-sectional view of an injection unit according to a first non-limiting embodiment of the invention.

Referring now to FIG. 2, an injection unit for a molding system in accordance with a first non-limiting embodiment is shown generally at 20. The injection unit 20 includes a barrel 22 adapted to receive a screw 24. Barrel 22 may include an optional protective liner (not shown). A cylinder head 26 closes off the end of barrel 22, and mounts a coaxially aligned nozzle 28. A melt channel 30 is defined between them, extending through barrel 22, cylinder head 26 and nozzle 28.

Resin material (typically thermoset or thermoplastic pellets) is fed from a hopper 32, through a feed throat 34 into melt channel 30. The rotational movement of screw 24 plasticizes the material prior to it exiting through nozzle 28. Preferably, screw 24 may include a plurality of specialized zones (not shown). For example, a first zone might include screw flights adapted for conveying solid material from the hopper 32, a latter zone for shearing and plasticizing the material, and a final zone for mixing the now-molten material prior to exiting through nozzle 28. Screw 24 may also include weirs or channels to separate out unmelted material from the melted material for further processing. Other adaptations will occur to those of skill in the art.

Figure 1:
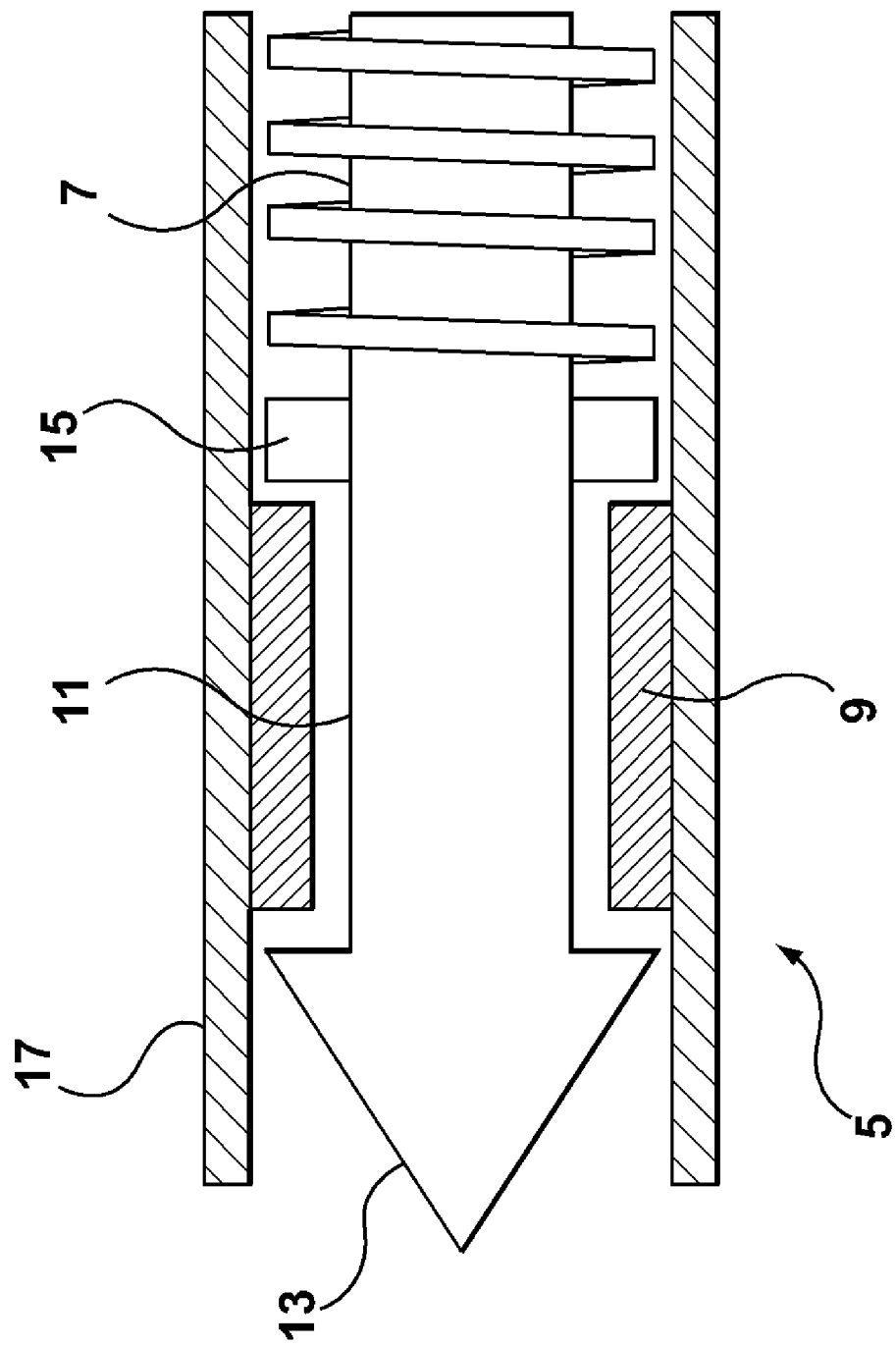
FIG. 1 is a cross-sectional view of a prior-art check valve.

In addition to rotating, screw 24 is preferably operable to reciprocate back and forth to express the melted material out through nozzle 28 and pack the material within a mold (not shown). A check valve 36 is provided near the tip of screw 24 to prevent the reentry of material during the forward motion of the screw during its injection phase. The rotational movements of screw 24 is provided by a motor 44, which may be an electric motor, a hydraulic motor, or a combination thereof (the embodiment depicted in FIG. 1 shows an electric version of motor 44). The rotational movement of screw 24 helps to convey, melt and mix the molten material. Screw 24 is also translatable within barrel 22 via piston 38, in order to apply injection and hold pressure during the molding process.

Heater bands 46 are provided along a portion of the length of barrel 22 (though away from the feed throat 34) to assist in the melting of the material (in addition to the heat generated by the shearing action of screw 24) and then maintain the temperature of the molten material as it approaches the nozzle 28. Preferably, heater bands 46 are covered with an insulating barrel cover 48 to minimize heat loss). Thermocouples 50 are provided along the barrel 22 to provide an indication of the material's temperature.

Figure 3:
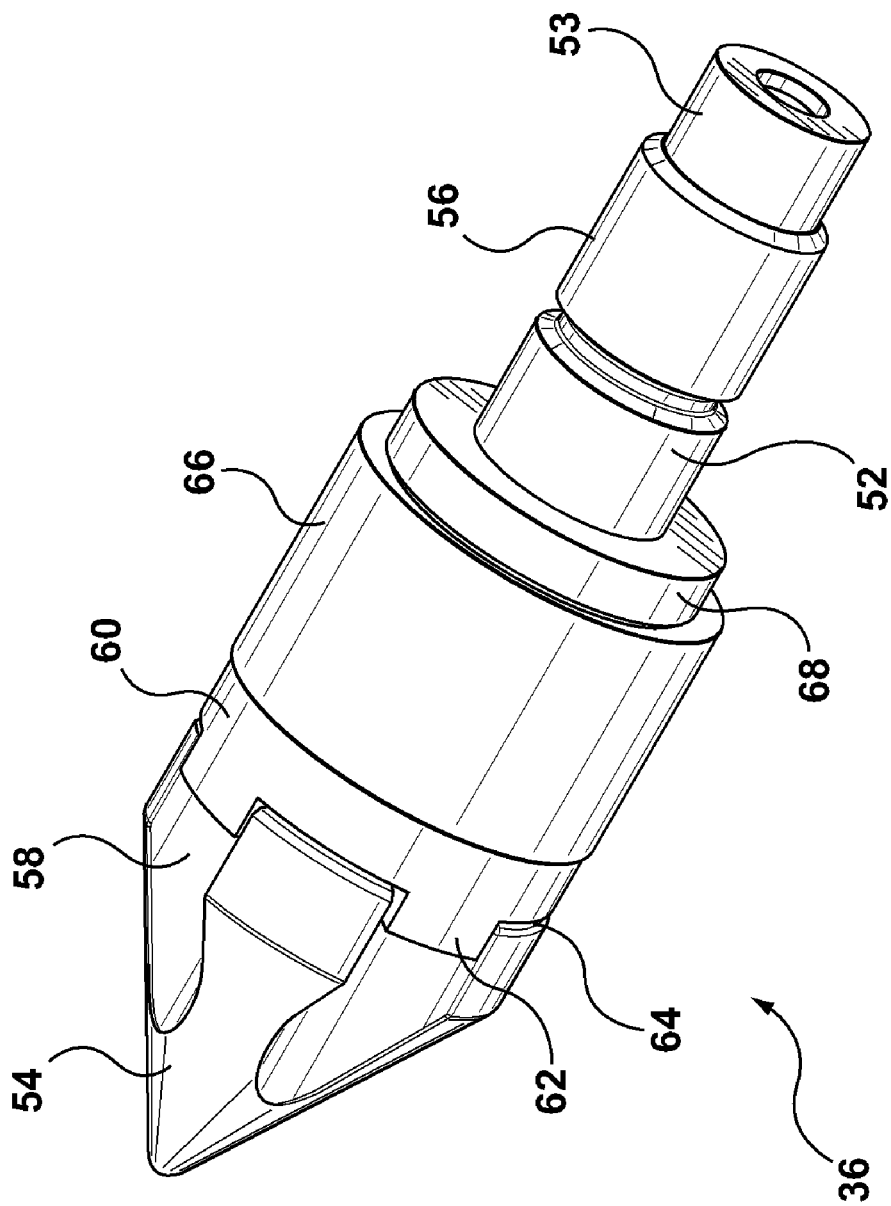
FIG. 3 is a perspective view of a non-limiting embodiment of a check valve for the injection unit of claim 2.
Figure 4:
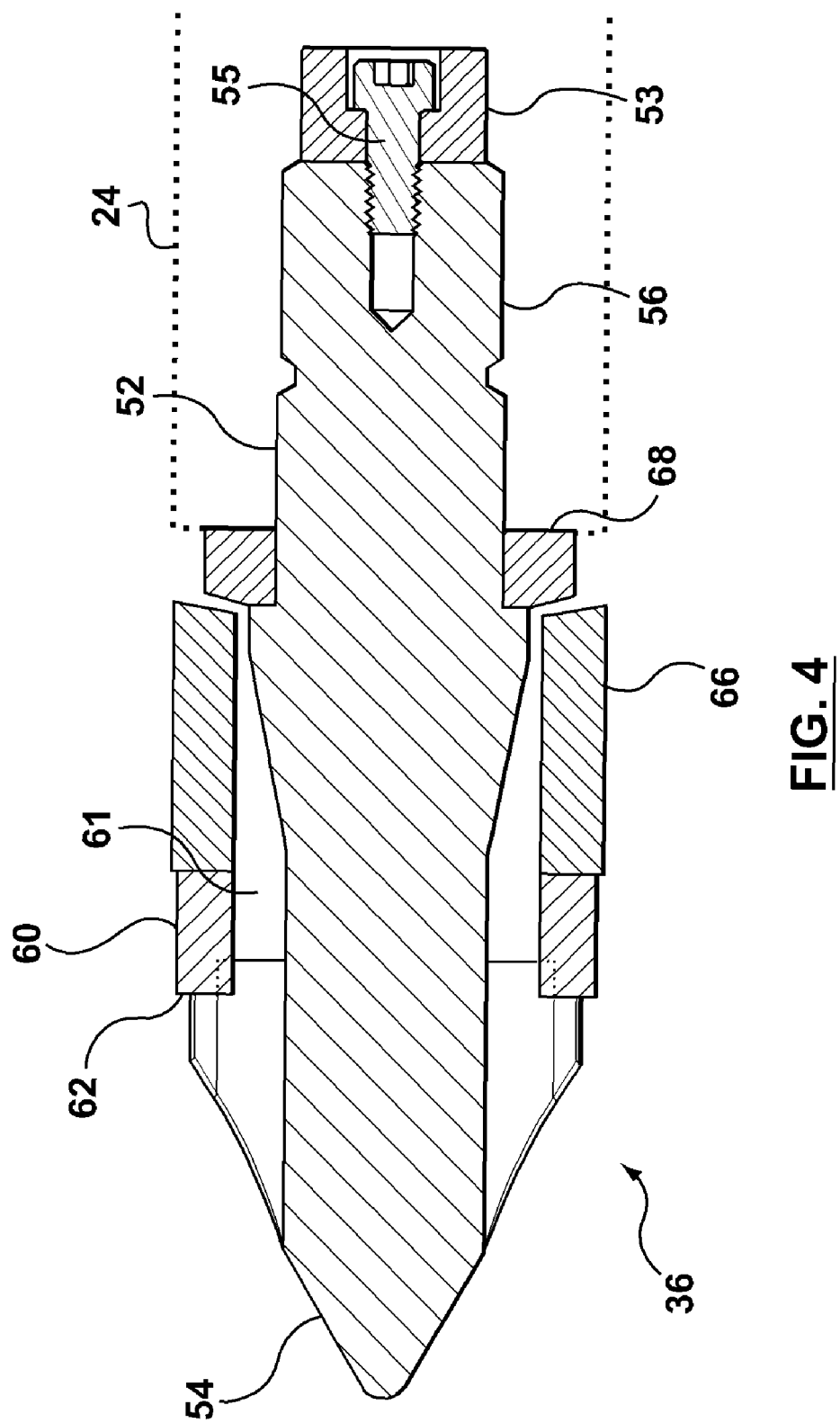
FIG. 4 is a cross sectional view of the check valve of FIG. 3.

Referring now to FIGS. 3 and 4, check valve 36 is described in greater detail. Both FIGS. 3 and 4 show check valve 36 in the open position. Check valve 36 comprises a shaft 52 and a retainer tip 54 at a distal end of shaft 52. Preferably, the opposing end of shaft 52 defines a threaded interface 56 adapted to be removably mated with in a complementarily-threaded interface on the end of screw 24 (shown in phantom). Once threaded, retainer tip 54 is kinematically coupled with screw 24 and thus rotates and translates in tandem with the screw. Preferably, a spacer 53 is attached to an end of shaft 52 by a fastener 55 to prevent the retainer tip 54 from bottoming out in the screw.

In the presently-illustrated embodiment, retainer tip 54 is generally conically shaped and defines a plurality of longitudinally-aligned flutes 58 along its exterior surface. Retainer tip 54 may be sized as to provide ample clearance from the interior surface of barrel 22 (FIG. 2). A first ring is floatably and concentrically mounted around shaft 52. In the presently-illustrated embodiment, the first ring is a crenellated ring 60. Crenellated ring 60 includes a plurality of teeth 62 circumferentially spaced around a first side 64 of the ring that are sized as to fit within flutes 58 defined in retainer tip 54. The teeth 62 are engaged by the sidewalls of retainer tip 54 so that crenellated ring 60 rotates in tandem with retainer tip 54/screw 24. The teeth 62 can be sized so as to provide a tight frictional fit that allows for substantially no linear movement between retainer tip 54 and crenellated ring 60, or it can have relaxed tolerance to allow for relative lateral movement between the two due to rearward melt pressure. Regardless of the fit, the teeth 62 will not disengage, in use, from retainer tip 54 so as to prevent relative rotation between the retainer tip 54 and crenellated ring 60. Crenellated ring 60 is diametrically sized to have substantially the same outer diameter as retainer tip 54 (that is to say, there is ample clearance between it and the interior surface of barrel 22). A gap 61 is provided between crenellated ring 60 and shaft 52 as to allow melt to flow under crenellated ring 60 and through flutes 58. Preferably, crenellated ring 60 is made from a wear-resistant or hardened material, can be treated or coated for additional wear-resistance as is known to those of skill in the art.

Located behind crenellated ring 60 (relative to retainer tip 54) is a second ring, namely floating ring 66, which has a larger diameter than crenellated ring 60. Floating ring 66 floats freely as in traditional prior-art rings for check-valves around shaft 52 (thereby providing part of the gap 61 for the melt to flow between the floating ring 66 and the shaft 52), and is sized as to abut against the interior surface of barrel 22. A rear seat 68 (fixedly attached to shaft 52) is located behind floating ring 66 (relative to retainer tip 54) to limit the linear movement of floating ring 66. When floating ring 66 abuts against rear seat 68, melt is prevented from flowing backwards in barrel 22.

Operation of check valve 36 is similar to that of prior-art designs. During the recovery phase, melt pressure forces the screw 24 (including the attached retainer tip 54 and crenellated ring 60) rearward, moving check valve 36 into its open position, allowing the melt to flow under the floating ring 66 (which remains substantially in place against the interior surface of barrel 22), and through flutes 58 towards the end of the barrel 22. During the injection phase, the screw 24 moves forward, bringing the rear seat 68 into contact with the floating ring 66, and thereby sealing off the melt path for the remainder of the injection stroke.

Relative (i.e., rotational) movement between the retainer tip 54 and the floating ring 66 is substantially eliminated, protecting the more expensive retainer tip 54 from wear damage by the ring. Instead, relative rotational movement occurs between the large, flat and uninterrupted contact surfaces of crenellated ring 60 and floating ring 66, resulting in lower contact pressure and wear. This design provides flexibility in material selection, surface treatment or hard-facing of the crenellated ring 60 and floating ring 66. One or both of crenellated ring 60 and floating ring 66 could be made of wear resistant materials, easy to manufacture and replace if necessary. Additionally, because the floating ring 66 does not ride against the retainer tip 54, the flutes 58 on the retainer tip can be made larger than with traditional prior-art designs, reducing pressure drop and increasing flow capacity of the check valve 36 and possibly recovery rate of the injection unit 20.

Figure 6:
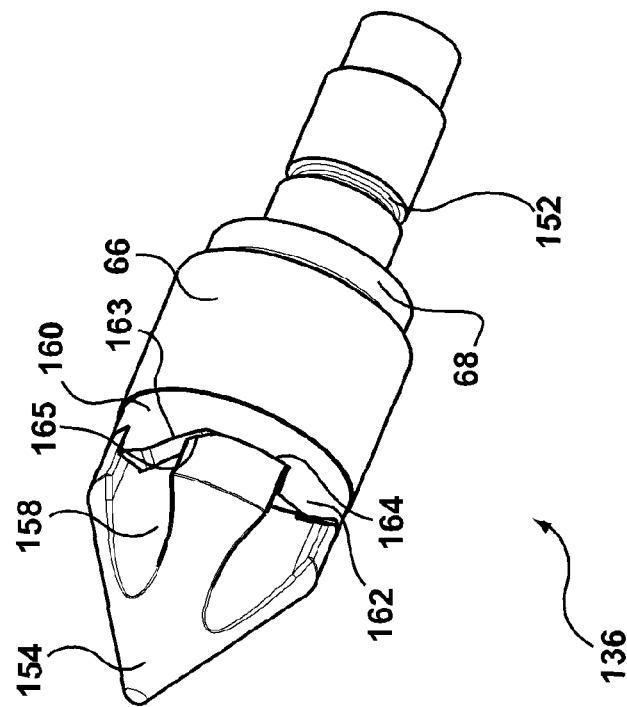
FIGS. 5 and 6 are perspective view of a check valve according to another non-limiting embodiment in the closed and open positions, respectively.
Figure 5:
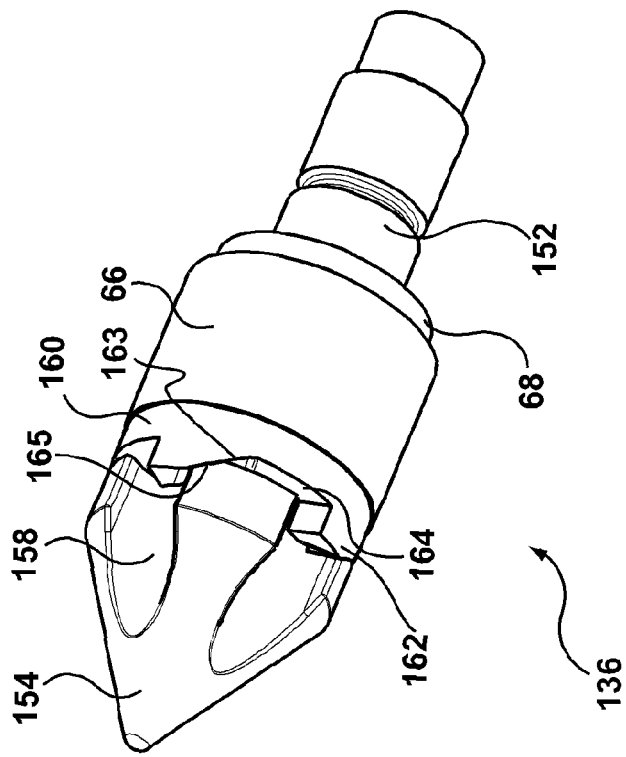

Referring now to FIGS. 5 and 6, an additional embodiment of the invention is shown generally at 136. FIG. 5 shows check valve 136 in the closed position while FIG. 6 shows check valve 136 in the open position. Check valve 136 is similar to check valve 36 and includes a shaft 152 and a retainer tip 154 at a distal end of shaft 152. Shaft 152 is adapted to be removably mated with a complementarily-threaded interface on the end of screw 24 (FIG. 2). Once threaded, retainer tip 154 is kinematically coupled with screw 24 and thus rotates and translates in tandem with the screw.

Like retainer tip 54, retainer tip 154 is generally conically shaped and defines a plurality of flutes 158, which are arranged longitudinally relative to the axis of retainer tip 154. Retainer tip 154 is sized as to provide ample clearance from the interior surface of barrel 22 (not shown). A first ring is floatably and concentrically mounted around shaft 152. In the presently-illustrated embodiment, the first ring is a crenellated ring 160. Crenellated ring 160 includes a plurality of teeth 162 circumferentially spaced around a first side 164 of the ring, and which are sized as to fit within the plurality of flutes 158 formed in retainer tip 154. In contrast to the sidewalls of the previously-described crenellated ring 60, a chamfered sidewall 163 is provided along at least a portion of each of the plurality of teeth 162. A complementary chamfered sidewall 165 is provided along at least a portion of the opposing sidewall of each of the plurality of flutes 158. Chamfered surfaces 163 and 165 define cam surfaces between retainer tip 154 and crenellated ring 160. The opposing side of each of the plurality of teeth 162 and the plurality of flutes 158 does not include chamfered surfaces. Located behind crenellated ring 160 (relative to retainer tip 154) is a second ring, namely floating ring 66, as is described with reference to check valve 36.

Operation of check valve 136 during the recovery phase is similar to that of check valve 36. The screw 24 rotates in a first direction to plasticize the melt. Melt pressure forces the screw 24 (including the attached retainer tip 154 and crenellated ring 160) rearward, moving check valve 136 into its open position, allowing the melt to flow under the floating ring 66 (which remains substantially in place against the interior surface of barrel 22), and through the plurality of flutes 158 towards the end of the barrel 22.

With check valve 136, during the injection phase, the screw 24 rotates a short distance (for example, a ¼ turn) in a second direction, i.e., the opposite direction to the direction of rotation during the recovery phase. Chamfered surfaces 163 and 165 act as cam surfaces to each other, displacing crenellated ring 160 backwards relative to retainer tip 154, bringing the floating ring 66 into contact with rear seat 68, and thereby sealing off the melt path for the remainder of the injection stroke (where the screw 24 translates forward as is described above). This design provides for fast closing of check valve 136, as a single ¼ turn of screw 24 can close the valve. Opening of check valve 136 occurs due to melt pressure as is described above. Normally, chamfered surfaces 163 and 165 do not break contact from each other due to the limited range of travel of crenellated ring 160.

The description of the non-limiting embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the non-limiting embodiments, it will be apparent that modifications and enhancements are possible without departing from the concepts as described. Therefore, what is to be protected by way of letters patent are limited only by the scope of the following claims.

What is claimed is:

1. A check valve (36, 136) for a screw (24), comprising:
    a retainer tip (54, 154), operable to be attached to a distal end of a screw shaft (52, 152), the retainer tip (54, 154) defining at least one melt channel (30), the at least one melt channel (30) being defined as a plurality of flutes (58, 158) longitudinally aligned on an exterior surface of the retainer tip (54, 154);
    a first ring (60), coaxially mounted to and rotationally-coupled with the retainer tip (54, 154), the first ring (60) being a crenellated ring (60, 160);
    a second ring (66), coaxially and slidably mounted relative to the retainer tip (54, 154), and operable to rotate relative to the retainer tip (54, 154); and wherein
    the second ring (66) is operable to reversibly move relative to the retainer tip (54, 154) between an open position which permits melt to flow through the check valve (36, 136) and a closed position which prevents backflow of the melt, and
    the first ring (60) includes a plurality of teeth (62, 162) which are sized as to fit within the plurality of flutes (58, 158) on the retainer tip (54, 154).

2. The check valve (36, 136) of claim 1, wherein the first ring (60) includes a plurality of teeth (62, 162) which are sized as to frictionally fit within the plurality of flutes (58, 158) on the retainer tip (54, 154).

3. The check valve (36, 136) of claim 1, wherein the first ring (60) includes a plurality of teeth (62, 162) which are sized as to allow linear movement of the crenellated ring (60, 160) relative to the retainer tip (54, 154).

4. The check valve (36, 136) of claim 1, wherein the first ring (60) has substantially the same diameter as the retainer tip (54, 154).

5. The check valve (36, 136) of claim 1, wherein the second ring (66) has a larger diameter than the first ring (60).

6. The check valve (36, 136) of claim 1, wherein the screw (24) shaft (52, 152) includes an interface for mounting the retainer tip (54, 154) to the screw (24).

7. The check valve (36, 136) of claim 1, wherein the second ring (66) abuts against the first ring (60) when in the open position.

8. The check valve (36, 136) of claim 1, wherein the check valve (36, 136) is adapted for use in an injection unit (20).

9. The check valve (136) of claim 2, wherein cam surfaces are provided between the retainer tip (154) and the first ring (60).

10. The check valve (136) of claim 9, wherein the cam surfaces are operable to move the check valve (136) between the open position and the closed position by rotation of the screw (24) in either a first direction or a second direction.

11. The check valve (136) of claim 10, wherein the cam surfaces include a chamfered sidewall (163) located on each of the plurality of teeth (162).

12. The check valve (136) of claim 11, wherein the cam surfaces include a complementary chamfered sidewall (165) located on each of the plurality of flutes (158).

13. The check valve (136) of claim 12, wherein the first direction is a direction of rotation of the screw (24) that is used to plasticize the melt and wherein the check valve (136) is adapted to move into the closed position by rotating in the second direction a ¼ turn.

* * * * *